March 24, 1964

W. C. KENT 3,126,036

APPARATUS FOR FORMING EYE BOLTS

Filed Aug. 29, 1960

INVENTOR
W. C. KENT
BY
ATTORNEY

March 24, 1964    W. C. KENT    3,126,036
APPARATUS FOR FORMING EYE BOLTS
Filed Aug. 29, 1960    4 Sheets-Sheet 2
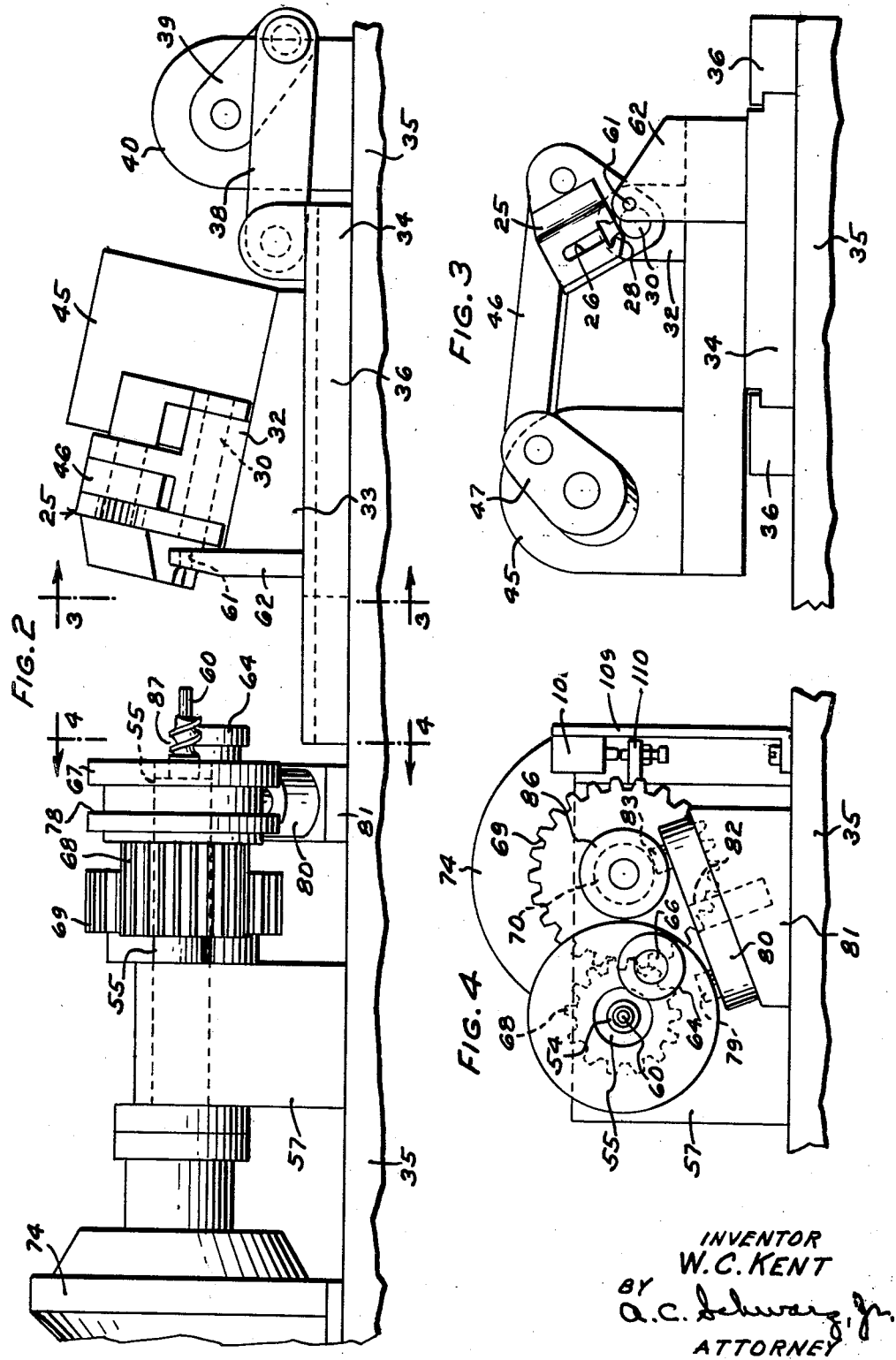

March 24, 1964 W. C. KENT 3,126,036
APPARATUS FOR FORMING EYE BOLTS
Filed Aug. 29, 1960 4 Sheets-Sheet 3
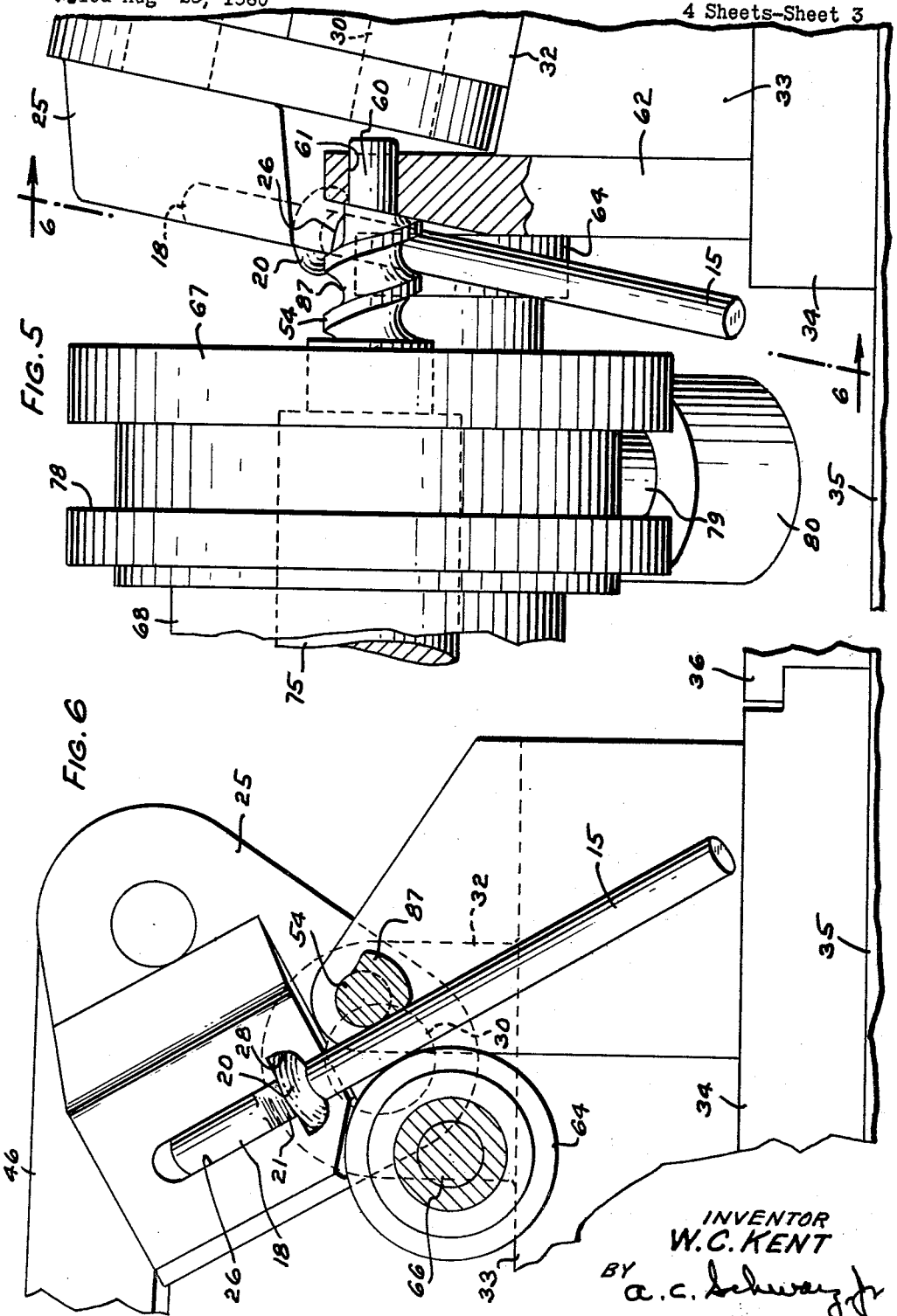
INVENTOR
W.C. KENT
BY a.c. Schwarz jr
ATTORNEY

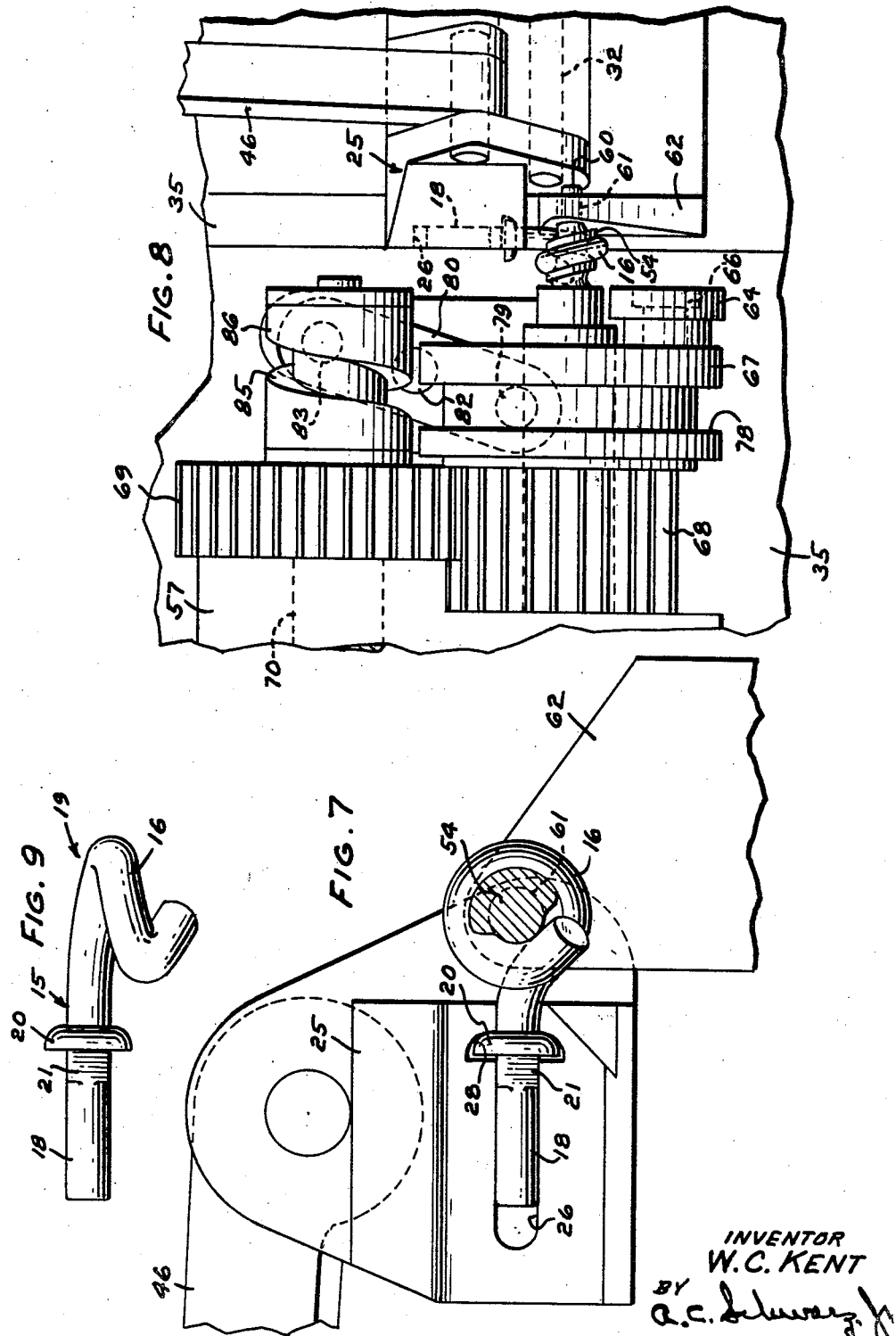

United States Patent Office 3,126,036
Patented Mar. 24, 1964

3,126,036
APPARATUS FOR FORMING EYE BOLTS
William C. Kent, Gahanna, Ohio, assignor to Western Electric Company, Incorporated, a corporation of New York
Filed Aug. 29, 1960, Ser. No. 52,689
4 Claims. (Cl. 140—104)

The present invention relates to apparatus for forming eye bolts, and more particularly to an apparatus for bending a rod to form an eye bolt having a helical loop.

An object of the present invention is to provide a rugged and effective apparatus for forming eye bolts.

A further object of the invention is to provide an apparatus for bending a rod into an eye bolt having a helical loop.

A further object of the invention is to provide an apparatus for bending one end of a straight rod into a helical loop to form an eye bolt and to bend the other end of the rod from a tangential to a radial relation with the loop.

With these and other objects in view, the present invention contemplates the provision of an arbor fixedly mounted on a frame, and a holder having a socket therein for receiving one end portion of the rod. The holder is pivotally mounted on the frame in a predetermined position relative to the arbor and has a normal loading position for receiving the rod and supporting it obliquely to the arbor and to a plane normal to the axis of the arbor and with an intermediate portion of the rod positioned between and in engagement with the arbor and a roller. Mechanism is provided to revolve the roller about the arbor to effect the bending of the free end of the rod about the arbor into a helical loop and for advancing the roller axially as the loop is being formed. Mechanism is also provided for then oscillating the holder to a second position to effect the bending of the other end portion of the rod from a tangential to a radial relation with the helical loop.

Other objects, advantages and novel aspects of the invention will become apparent upon consideration of the following detailed description, in conjunction with the accompanying drawings, wherein:

FIG. 2 is a fragmentary front view of the apparatus;

Figure 1:
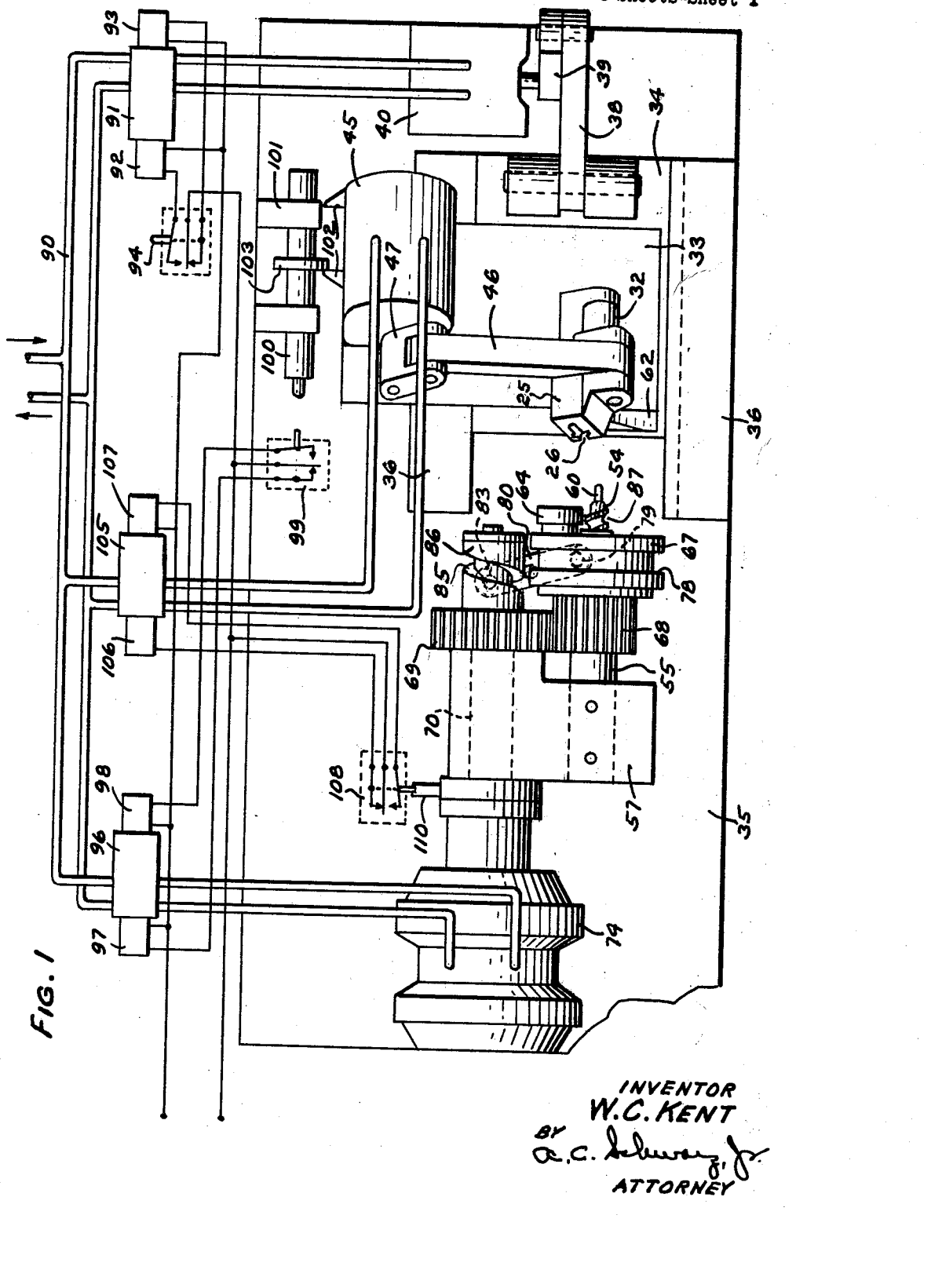
FIG. 1 is a plan view of the apparatus with the control means therefor indicated diagrammatically.

FIGS. 3 and 4 are fragmentary vertical cross sectional views of the apparatus taken on lines 3—3 and 4—4, respectively, of FIG. 2;

FIG. 5 is an enlarged fragmentary side view of the apparatus with portions in section and showing the article supported in engagement with the arbor;

FIG. 6 is a fragmentary vertical cross sectional view of the apparatus taken on the line 6—6 of FIG. 5 and showing the rod in position to be bent about the arbor;

FIG. 7 is a fragmentary view of the apparatus similar to FIG. 6 showing the eye bolt on completion of the bending operation;

FIG. 8 is a fragmentary plan view of the apparatus on completion of the rod bending operation; and FIG. 9 is a plan view of the eye bolt shown in FIG. 7.

Referring to the drawings, particularly FIGS. 5, 6, 7 and 9, the present invention was designed to bend one end of a rod 15 to form a helical loop 16 and to bend the other end 18 of the rod from a tangential to a radial relation with respect to the helical loop 16 to form an eye bolt 19. The rod 15 has an annular shoulder or collar 20 formed integral therewith intermediate the ends thereof but closer to the end 18, and the rod 15 is provided with a square portion 21 adjacent the shoulder 20. The helical loop 16 is formed to provide space between the laterally overlapping portions of the loop so that wires, rods and other articles may be inserted therein and supported in the loop.

The apparatus is provided with a holder 25 having a nest or recess 26 of substantially rectangular cross section for receiving the end portion 18 of the rod 15, the recess 26 being enlarged at 28 to receive the shoulder 20 of the rod and hold the rod against longitudinal movement. The holder 25 is pivotally mounted on a pin 30 which is supported in an oblique position in a boss 32 (FIGS. 2 and 3) extending upwardly from a block 33. The block 33 is mounted on a slide 34 that is slidably supported on a horizontal frame plate 35 and is guided for reciprocatory movement in guideways 36. At one end thereof, the slide 34 is connected through a link 38 (FIGS. 1 and 2) to a crank arm 39 which is oscillated by a hydraulically operated actuator 40 for effecting reciprocation of the slide 34 and the holder 25 to and from a retracted or loading position (FIGS. 1 and 2) and an operative position (FIGS. 5 and 8).

The holder 25 is adapted to be oscillated from a normal first position (FIG. 6) to a bending position (FIG. 7) by a hydraulically operated actuator 45 to which it is connected by means of a link 46 and a crank arm 47. The actuator 45 is fixed to the block 33 and moves with the slide 34.

After a rod 15 has been placed in the recess 26 of the holder 25 (FIG. 6), the slide 34 is advanced to carry the rod 15 into engagement with an arbor 54 around which the free portion of the rod is adapted to be bent to form the helical loop 16. The arbor 54 is fixedly mounted on the end of a shaft 55 which is secured in a supporting block 57 on the horizontal frame plate 35. A reduced end 60 of the arbor is adapted to enter an aperture 61 in a bracket 62 on the slide and to be supported thereby during the rod bending operation. As shown in FIGS. 5 and 6, the rod 15 is supported by the holder 25 obliquely and at the proper angle relative to the arbor 54 for the winding of the free portion of the rod into the helical loop 16, and the rod is also located between and in engagement with the arbor 54 and a winding element in the form of a roller 64 (FIG. 6).

The roller 64 is supported on a stud 66 for rotation about an axis in parallel and spaced relation to the axis of the arbor 54. The stud 66 is secured to a circular head 67 that is mounted for rotation and axial sliding movement on the shaft 55. A gear 68 is fixed to one end of the head 67 and meshes with a larger gear 69 secured to a shaft 70 (FIG. 1) which is rotatably supported in the bearing block 57 and is connected to a hydraulically operated actuator 74. The shaft 70 is oscillated by the actuator 74 through slightly less than one revolution for imparting revolving movement to the winding roller 64 through approximately one and one-half revolutions about the arbor 54 to effect the bending of a portion of the rod 15 into the helical loop 16.

The roller 64 is moved axially as the helical loop 16 is formed in order to avoid engagement with the holder 25. However, it will be understood that if the helical angle of the loop 16 is such that there is no interference, the roller 64 may be made long enough to engage the rod and effect the winding of the loop 16 without being moved axially.

Mechanism for imparting axial movement to the bending roller 64 in timed relation to the bending of the rod 15 around the arbor comprises an annular cam groove 78 formed in the head 67 for receiving a cam follower 79 which is mounted on one end of a lever 80 (FIGS. 4 and 8). The lever 80 is mounted on a supporting block 81 on the frame plate 35 for oscillatory movement about a pivot 82 intermediate its ends; and at its other end, the lever has a cam follower 83 engageable in a cam groove 85 of a cam 86 secured to the shaft 70 for rotation therewith.

Thus, during the bending of the rod 15 to form the helical loop 16 thereon, the cam 85 in cooperation with the lever 80 serves to move the roller 64 axially to maintain the roller in engagement with the rod 15 during the bending of successive portions thereof into the helical loop 16. The roller 64 is moved beyond and in spaced relation to the end of the rod 15 on completion of the bending operation.

It will be understood that as the roller 64 completes the loop forming operation and rides off of the end of the rod, the loop 16 springs open a small amount and the end of the loop is positioned in the reverse path of travel of the roller. Thus subsequently when the roller 64 returns to its initial starting position, it serves to unwind the eye bolt from the helical portion of the arbor 54 and leave it supported on the straight end portion of the arbor from which it may readily be removed.

It should be noted that the gear 68 is wider than the gear 69, which permits meshing engagement of the gears as the roller 64 is moved, the gear 68 moving also.

After the helical loop 16 has been formed on the rod 15, the holder 25 is moved by the actuator 45 through the link 47 and the crank arm 46 from the position shown in FIG. 6 to the position shown in FIG. 7 to bend the end portion 18 of the rod 15 from a position tangential to the loop 16 to a position radial to the loop.

The arbor 54 may have a cylindrical outer surface but preferably is provided with a helical groove 87 having a substantially semi-circular cross section conforming substantially to the cross section of the rod to insure that the inner portion of the helical loop 16 of the rod 15 is not flattened during the bending operation.

Referring to FIG. 1, it will be understood that the actuator 40 serves to oscillate the crank arm 39 through a predetermined angular traverse to reciprocate the slide 34 through a predetermined distance and that the actuator 40 is operated by hydraulic fluid supplied thereto from a supply line 90 under control of a reversing valve 91. The valve 91 is shifted from one position to another by means of solenoids 92 and 93 selectively energized under control of a manually operated switch 94.

The actuator 74 serves to oscillate the shaft 70 through slightly less than one revolution and to impart revolving movement to the winding roller 64 through approximately one and one-half revolution about the arbor 54 in opposite directions to and from an initial starting position and during this revolving movement the winding roller is reciprocated axially by means of the cam 86 and the lever 80. Hydraulic fluid from the supply line 90 is supplied to the actuator 74 under control of a reversing valve 96 which is shifted from one position to another by means of solenoids 97 and 98. These solenoids are selectively energized under control of a switch 99 which is mounted on the horizontal frame plate 35 and is biased to a normal position to effect the movement of the winding roller 64 to its normal starting position.

The switch 99 is adapted to be actuated by a plunger 100 to effect the shifting of the valve and the operation of the actuator 74. The plunger 100 is supported in brackets 101 on the horizontal frame plate 35 and is reciprocated longitudinally by a pair of spaced lugs 102 on the actuator 45 which engage a collar 103 on the plunger in response to movement of the actuator 45 and the slide 34 to and from advanced and retracted positions.

Hydraulic fluid from the line 90 is supplied to the actuator 45 under control of a reversing valve 105 which is shiftable from one position to another by a pair of solenoids 106 and 107 which in turn are selectively actuated by a switch 108. This switch is supported on a bracket 109 (FIG. 4) on the horizontal frame plate 35 and is biased to effect the movement of the rod holder 25 to its normal position (FIG. 3). The switch 108 is located in the path of movement of an arm 110 secured to the shaft 70 for rotation therewith and the switch 108 is actuated by the arm 110 in response to completion of the loop forming operation by the roller 64 and serves to shift the reversing valve 105. This effects the operation of the actuator 45 and the pivotal movement of the rod holder 25 from its initial position through a predetermined traverse resulting in the bending of the end 18 of the rod 15 to a position radial to the loop 16 of the eye bolt (FIG. 7).

In the operation of the apparatus, with the slide 34 and the rod holder 25 in retracted position, a rod 15 is applied to the holder 25 and seated in the recess 26 thereof as shown in FIG. 6, after which the switch 94 is manually actuated to effect the operation of the actuator 40 through the valve 91 and the movement of the slide 34 from its retracted to its forward position. This advances the holder 25 and positions the rod 15 between the end portion of the arbor 54 and the winding roller 64. In response to the movement of the slide to its forward position, the plunger 100 thereon actuates the switch 99 to effect the operation of the actuator 74 through the valve 96. This results in the revolving movement of the roller 64 through substantially one and one-half revolutions and the bending of a portion of the rod 15 about the arbor 54 to form the helical loop 16 and also simultaneously results in the axial movement of the roller 64 as it bends the rod into the helical loop 16 and moves from the end thereof.

On completion of this bending operation, the switch 108 is actuated by the arm 110 to effect the operation of the actuator 45 through the valve 105, the pivotal movement of the rod holder 25 from its normal position and the bending of the end portion 18 of the rod from a position tangential to the loop 16 to a position radial thereto. On completion of the bending of the rod 15 into an eye bolt 19, the operator actuates the switch 94 to effect the retraction of the slide 34 during which movement the completely formed eye bolt is withdrawn from the recess 26 of the holder 25 and is supported on the arbor 54. After the separation of the holder 25 from the eye bolt 19 during the return movement of the slide 34, the switch 99 is actuated to effect the reverse operation of the actuator 74 and the return movement of the roller 64 to its initial position. As pointed out hereinbefore, the roller 64 during its return movement unwinds the eye bolt 19 from the helical portion of the arbor 54 and leaves it supported on the straight end portion thereof from which it is manually removed.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. An apparatus for forming an eye bolt from a straight rod comprising an arbor, means for fixedly supporting said arbor, a slide on said supporting means movable parallel to the axis of said arbor, a holder mounted on said slide for pivotal movement and having a recess for receiving one end of the rod for supporting the rod obliquely and adjacent to the axis of said arbor, means for moving said slide from a normal retracted position permitting the loading of a rod into said holder to a forward winding position with the rod in engagement with said arbor, a roller, means for revolving said roller about the axis of said arbor to bend the rod into a helical loop about said arbor, and means for pivoting said holder to bend said one end of the rod from a tangential to a radial relation with respect to said helical loop.

2. An apparatus for forming an eye bolt from a straight rod comprising an arbor, means engageable with one end of said arbor for fixedly supporting said arbor, a slide on said supporting means movable parallel to the axis of said arbor, a holder mounted on said slide for pivotal movement about an axis disposed obliquely to the axis of said arbor and having a recess for receiving one end of the rod for supporting the rod obliquely and adjacent to the axis of said arbor, means for moving said slide from the normal retracted position spaced from said arbor and permitting the loading of the rod into said holder to a forward winding position with the rod in engagement with said arbor, a roller, means for revolving said winding roller about the axis of said arbor to effect the bending of the rod into a helical loop about said arbor, means on said slide engageable with the other end of said arbor for supporting said arbor, and means for pivoting said holder to bend said one end of the rod from a tangential to a radial relation with respect to said helical loop.

3. An apparatus for forming an eye bolt from a straight rod comprising an arbor, means for fixedly supporting said arbor, a slide on said supporting means movable parallel to the axis of said arbor, a holder mounted on said slide having a recess for receiving one end of the rod for supporting the rod obliquely and adjacent to the axis of said arbor, means for moving said slide from a normal retracted position spaced from said arbor and permitting the loading of a rod into said holder to a forward winding position with the rod in engagement with said arbor, a roller, means for revolving said roller about the axis of said arbor to bend the rod into a helical loop about said arbor, and means controlled by said slide moving means moving said slide to the forward winding position for actuating said roller revolving means.

4. The apparatus defined in claim 3 including the provision of means for pivotally supporting said holder on said slide, means for pivoting said holder to bend said one end of the rod from tangential to radial relation with respect to said helical loop, and means controlled by said roller revolving means when said helical loop is completed for actuating said holder pivoting means.

References Cited in the file of this patent

UNITED STATES PATENTS

| 399,160 | Rice | Mar. 5, 1889 |
| 1,261,550 | Kilmer | Apr. 2, 1918 |
| 1,475,813 | Gordon | Nov. 27, 1923 |
| 2,374,520 | Anderson | Apr. 24, 1945 |

FOREIGN PATENTS

| 658,442 | Great Britain | Oct. 10, 1951 |